United States Patent Office 3,372,192
Patented Mar. 5, 1968

3,372,192
PREPARATION OF FLUORINE-GUANIDINES
AND BI-GUANIDES
Claude E. Merrill, Lancaster, Calif., assignor to The Dow
Chemical Company, Midland, Mich., a corporation of
Delaware
No Drawing. Filed June 25, 1964, Ser. No. 379,436
7 Claims. (Cl. 260—564)

This invention relates to a novel process for preparing fluorinated guanidine and fluorinated biguanide materials.

It is a principal object of the present invention to provide a novel process for preparing fluorinated guanidine and fluorinated biguanide materials using an aqueous solution of a guanidine or biguanide source material which achieves fluorine utilization markedly improved over conventional processes.

It is another object of the present invention to provide a novel process for preparing perfluoroguanidine in high yields.

It is also an object of the present invention to provide a novel fluorination process which offers the advantages of continuous operation, short residence time of the fluorinated product in the reactor and improved fluorine efficiency over conventional pot methods now employed.

These and other objects and advantages readily will become apparent from the detailed description presented hereinafter.

In accordance with the present process, a flowing film of an aqueous solution having a guanidine salt or biguanide source material as a solute is contacted with fluorine thereby to provide fluorinated products of the corresponding source material in high yield. These products are collected and recovered.

More particularly in carrying out the present process a buffered aqueous solution of a guanidine salt, e.g. guanidine carbonate, guanidine sulfate, or guanidine phosphate, or biguanide is passed as a thin liquid film in contact with fluorine gas. The resulting fluorinated product materials are collected in a cold condenser, gas collector or the like receiver and the fluorinated product recovered by fractional distillation, chromatographic techniques or other separation and recovery procedures.

In this process, the aqueous solution of the guanidine salt or biguanide is employed at a concentration of from about 0.01 to about 2 molar with respect to the solute, but these ranges are not critical. However, concentrations much above 2 molar are difficult to realize in the solution. For use in the present process, the feed solution ordinarily is buffered within the range of from about pH 7 to about pH 11 and preferably between about pH 8 and 9.

With these feed solutions, highly effective fluorination is achieved by contacting the thin film of guanidine or biguanide material at fluorine flows of from about 1 to about 30 times or more that of the aqueous guanidine salt or biguanide feed stock solution while maintaining a reactor temperature of from about the freezing point of the liquid reactant to about 50° C. and preferably from about 2 to about 10° C.

The actual ratio of fluorine and guanidine-biguanide feed stock material to be employed is not critical. Any excess fluorine that is not reacted can be recovered from the fluorinated product and can be recycled for subsequent reaction.

Conveniently, the reaction is carried out by passing the guanidine salt or biguanide feed solution from a reservoir down through a vertical tubular reactor while simultaneously flowing fluorine countercurrently up through the reactor. The aqueous solution passes out through the bottom of the tubular reactor exiting through a trap. This trap serves to assure that the fluorine reactant entering at the bottom of the reactor can only progress upward therethrough. Volatile fluorinated guanidine and biguanide products are carried with the fluorine upwards out of the reactor and passed into a cold trap. Any excess fluorine passes through this trap and can be recycled for reuse; the fluorinated product materials are condensed in the trap and can be recovered therefrom.

Buffering of the aqueous guanidine and biguanide feed stock materials readily is accomplished by use of acid phosphate-borate mixtures, e.g. $KH_2PO_4$-$H_3BO_3$, buffered acid sulfate-phosphate-hydroxide mixtures, e.g.

$H_2SO_4$-$H_3PO_4$-KOH and the like buffers.

The fluorine can be used directly or employed in diluted form as a mixture with an inert gas which is not affected by the reactants or products such as nitrogen, argon, etc. Generally with such admixtures, at a minimum, the fluorine is present at about 10 volume percent of the total gaseous mixture.

The present process can be carried out in either batch type or continuous operation. However, ordinarily because of its nature, continuous operation is employed. Reactors and processing equipment to be employed are fabricated from those materials which are not detrimentally affected by the reactants or product materials and which have the requisite physical strength and desired structural characteristics as in understood by one skilled in the art. Stainless steel, nickel, nickel alloys and the like all are suitable materials of construction.

The following examples serve to further illustrate the present invention but are not meant to limit it thereto.

*Example 1.*—An aqueous feed solution about 1.5 molar in guanidine sulfate, about 0.8 molar in potassium dihydrogen orthophosphate ($KH_2PO_4$) and 0.2 molar in boric acid ($H_3BO_3$) which was buffered to a pH of about 8.7 was placed in a dropping funnel having its lower end connected to a 12-inch long vertical section of 12 millimeter diameter glass tubing. A side take-off tube was positioned near the top of the tubing. This lead to a cold trap receiver. The bottom of the tube was fitted with a gas inlet tube and a liquid discharge conduit, the latter having a trap to prevent gas loss through this liquid discharge member. The portion of the tube between the top and bottom inlet and discharge member was fited with a water jacket to provide for cooling.

The vertical reactor tube was maintained at a temperature of about 2° C. by cooling water circulating through the jacket.

The buffered guanidine sulfate solution at a temperature of about 25° C. was allowed to flow from the dropping funnel passing down the inner wall of the vertical reactor tube as a thin liquid film. A flow rate of about 25 cubic centimeters per minute was employed to give the desired thin film in the vertical reactor tube. Simultaneously fluorine gas (substantially 100% $F_2$) was passed countercurrently up through the tube at a flow rate of about 300 cubic centimeters per minute.

The reaction products were swept upward by unreacted fluorine being carried through the side take-off tube near the top of the 12-inch vertical reactor tube to a receiver maintained at a temperature of about minus 183° C. The fluorine passed through this trap receiver and exited from the system again being recycled for reuse. The fluorinated guanidine containing product mixture was condensed and collected in the cold receiver. The product mixture was separated into its components by codistillation followed by vapor phase chromatography, the components thus being identified.

After three minutes' operation about 136 milligrams of perfluoroguanidine were recovered as the chief constituent of the product mixture. This yield corresponded to about 1 gram of perfluoroguanidine produced for every ten grams of fluorine passed through the reactor.

In addition to the principle product (perfluoroguanidine) some carbon dioxide and fluorine nitrate ($FNO_3$) along with lesser amounts of nitrous oxide ($N_2O$), sulfuryl fluoride ($SO_2F_2$), sulfur hexafluoride ($SF_6$), N,N-difluorcyanamide ($NF_2CN$) and perfluoroformamidine also were observed to be present in the product reactant mixture.

*Example 2.*—Using the apparatus and general procedure described for Example 1, an aqueous solution containing about 241 grams guanidine carbonate per liter (~1.34 molar) was heavily buffered to a pH of about 11 with a mixture of sulfuric acid, phosphoric acid and potassium hydroxide. This buffered solution was fed at a flow rate of about 30 cubic centimeters per minute as a thin liquid film down the inner wall of the reactor tube. The tube was cooled with cooling water at about 2° C. Concurrently, fluorine, as a mixture of about 91 volume percent fluorine-9 volume percent nitrogen was introduced countercurrently up through the reactor tube at a total flow rate of about 282 cubic centimeters per minute.

In this run, the product mixture, excess fluorine and nitrogen was passed through a trap cooled to about minus 40° C. to remove substantially all of the water and $N_2O_4$. A second trap maintained at about minus 100° C. caught substantially all of the products.

Nitrogen slowly was bubbled through the condensed mass in the second trap receiver while permitting the temperature of the mass to warm from about minus 100° C. to about minus 40° C. The liquid product remaining in the receiver after this operation was found to be substantially perfluoroguanidine of about 90 percent purity. This product was removed from the receiver and transferred by vapor phase to a storage container.

*Example 3.*—A number of runs were made using the apparatus and general procedures described for Example 1 employing buffered guanidine sulfate solutions wherein the concentration of guanidine sulfate varied from about 0.01 molar to about 2 molar and the feed solutions were buffered to be within pH of from 7 to about 11. In these tests, aqueous solution flow rates at about 25 cubic centimeters per minute were used. Fluorine flow rates of from about 30 to about 1000 cubic centimeters per minute were employed using fluorine alone or fluorine-nitrogen mixtures containing up to 75 percent by volume nitrogen. Also, the tubular reactor temperatures were varied from about 0 to about 51° C. as determined by temperature of the water fed into the jacket surrounding the jacket.

In all of these runs, good yields of perfluoroguanidine were realized. The following characteristics of the process also were determined from these studies.

(1) With excessively high fluorine flow rates, fluorine efficiency drops off as determined from the amount of perfluoroguanidine product. This is not detrimental, however, as the fluorine ordinarily is recycled for reuse.

(2) Fluorine efficiency also diminishes with decreasing concentrations of fluorine in the fluorine-nitrogen feed gas reactant.

(3) At the higher water jacket temperatures, e.g. about 50° C., the concentration of perfluoroguanidine in the product decreases somewhat although because of increased reaction the total yield of perfluoroguanidine decreases only slightly.

(4) For a given amount of fluorine passed through the reactor, the quantity of perfluoroguanidine produced increases with increase in the concentration of the guanidine salt in the aqueous buffered feed stock solution.

*Example 4.*—A solution consisting essentially of 10 grams biguanide, 8 grams monopotassium dihydrogen orthophosphate and 1.3 cubic centimeters of 85 percent orthophosphoric acid in 200 cubic centimeters of water (solution exhibited a pH of 8.6) was fed into the reactor tube of the apparatus described in Example 1 at a flow rate of about 20-30 cubic centimeters per minute. The thin film of this solution on the wall of the reactor was contacted therein by a mixture of about 30 volume percent fluorine and about 70 volume percent nitrogen passed countercurrently up through the tube at a flow rate of about 300 cubic centimeters per minute. Cooling water at about 5° C. simultaneously was passed through the water jacket of the reactor. The reaction products were swept upward by the fluorine and nitrogen mixture and carried to a cold trap receiver immersed in liquid oxygen. The product mixture was condensed and collected in this receiver. Separation of the product mixture into its components by codistillation followed by vapor phase chromatography yielded perfluorobiguanide. The product mixture also showed the presence of difluorocyanamide ($NF_2CN$), nitrous oxide ($N_2O$), carbon dioxide ($CO_2$) fluorine nitrate ($FNO_3$), perfluoroformamidine and perfluoroguanidine.

Various modifications can be made in the present process without departing from the spirit or scope thereof for it is understood that I limit myself only as defined in the appended claims.

I claim:
1. A process for preparing fluorine and nitrogen containing organic compounds which comprises;
 (a) providing an aqueous solution having a solute member selected from the group consisting of guanidine salts and biguanide, the guanidine salt solute member being selected from the group consisting of guanidine carbonate, guanidine sulfate and guanidine phosphate,
 (b) contacting a flowing liquid film of said solution with fluorine thereby to prepare fluorinated products of the corresponding solute member of said aqueous solution, and
 (c) recovering said fluorinated products.

2. A process for preparing fluorinated products from guanidine salts and biguanide which comprises;
 (a) providing a buffered aqueous solution having a solute member selected from the group consisting of guanidine salts and biguanide, the guanidine salt solute member being selected from the group consisting of guanidine carbonate, guanidine sulfate and guanidine phosphate, the concentration of said solute in said solution ranging from about 0.01 to about 2 molar and said solution buffered to be within the range of from pH 7 to about pH 11,
 (b) flowing a liquid film of said solution and contacting said liquid film with fluorine at a flow rate of from about 10 to about 100 times that of said aqueous solution while maintaining a reaction temperature of from about 0 to about 50° C. thereby to prepare fluorinated products of the corresponding solute member, and
 (c) collecting said fluorinated products.

3. A process for preparing perfluoroguanidine which comprises;
 (a) providing a buffered aqueous solution of a guanidine salt, said guanidine salt being a member selected from the group consisting of guanidine carbonate, guanidine sulfate and guanidine phosphate, the concentration of said guanidine salt in said solution ranging from about 0.01 to about 2 molar and said solution buffered to be within the range of from pH 7 to about pH 11.
 (b) contacting a liquid film of said solution in countercurrent flow with fluorine, the flow rate of said fluorine being from about 10 to about 100 times that of said aqueous solution while maintaining a reaction temperature of from about 0 to about 50° C.,
 (c) condensing and collecting the reaction products resulting from reaction of said guanidine salt and said fluorine, and
 (d) recovering perfluoroguanidine from said reaction products.

4. The process as defined in claim 3 wherein the aqueous solution is buffered to be within about pH 8 to pH 9.

5. The process as defined in claim 3 wherein the fluorine is employed in admixture with an inert gas, said admixture containing up to about 75 percent by volume of said inert gas.

6. A process for preparing perfluorobiguanide which comprises;
 (a) providing a buffered aqueous solution of biguanide, the concentration of said biguanide in said solution ranging from about 0.01 to about 2 molar and said solution buffered to be within the range of from pH 7 to about pH 11,
 (b) contacting a liquid film of said solution in countercurrent flow with fluorine, the flow rate of said fluorine being from about 10 to about 100 times that of said aqueous solution while maintaining a reaction temperature of from about 0 to about 50° C.,
 (c) condensing and collecting the reaction products resulting from reaction of said biguanide and said fluorine, and
 (d) recovering perfluorobiguanide from said reaction products.

7. The process as defined in claim 6 wherein the aqueous solution is buffered to be within about pH 8 to pH 9.

References Cited

UNITED STATES PATENTS 2,945,061   7/1960   Habernickel ____ 260—694 XR

OTHER REFERENCES

Attaway et al., J. Am. Chem. Soc., vol. 81 pp. 3599 to 3603 (1959).

Lawton et al., J. Am. Chem. Soc., vol. 81, p. 4755 (1959).

CHARLES B. PARKER, *Primary Examiner.*

REUBEN EPSTEIN, *Examiner.*

L. SEBASTIAN, ROBERT V. HINES,
 *Assistant Examiners.*